United States Patent [19]

Weis

[11] 4,202,219
[45] May 13, 1980

[54] CHAIN PIN ASSEMBLY WITH CAPTIVE SECURING MEANS

[75] Inventor: Siegfried K. Weis, Byron Center, Mich.

[73] Assignee: C. L. Frost & Son, Inc., Grand Rapids, Mich.

[21] Appl. No.: 897,401

[22] Filed: Apr. 18, 1978

[51] Int. Cl.² .................... G01F 3/08; G01F 3/14
[52] U.S. Cl. .................... 74/254; 74/245 C; 74/250 R; 74/251 C; 74/251 R
[58] Field of Search .............. 59/84, 85; 104/172 C; 198/851, 685, 683, 687; 85/8.6, 8.9, 8.8; 305/58 R, 58 PC; 403/344, 261, DIG. 6, 326; 74/245 R, 245 C, 248, 249, 250 R, 250 C, 251 R, 251 C, 252, 253 R, 254

[56] References Cited

U.S. PATENT DOCUMENTS

| 304,004 | 8/1884 | Hull | 74/251 C |
|---|---|---|---|
| 589,683 | 9/1897 | Appleby | 85/8.8 |
| 870,704 | 11/1907 | Weston | . |
| 901,789 | 10/1908 | Dodge | 74/251 R |
| 902,205 | 10/1908 | Brown | 85/8.6 |
| 1,082,332 | 12/1913 | Howe et al. | . |
| 1,442,223 | 1/1923 | Knebusch | 403/326 |
| 1,557,172 | 10/1925 | Klein et al. | . |
| 1,566,410 | 12/1925 | Lomando | . |
| 1,650,573 | 11/1927 | Searles | 403/261 |
| 1,660,354 | 2/1928 | Phelps | 74/254 |
| 1,844,463 | 2/1932 | Dodd | 85/8.8 |
| 1,947,421 | 2/1934 | Mize | 74/254 |
| 2,507,025 | 5/1950 | Lemmon | 74/254 |
| 2,507,458 | 5/1950 | Rose | 74/249 |
| 2,897,022 | 7/1959 | Marola | 308/208 |
| 3,056,308 | 10/1962 | Burrows | 74/254 |
| 3,457,721 | 7/1969 | Trudeau | 74/254 |
| 3,466,073 | 9/1969 | Pohle | 74/251 R |
| 3,646,752 | 3/1972 | Kampfer | 74/250 C |
| 3,742,863 | 7/1973 | Rosenberger, Jr. | 198/851 X |
| 4,020,629 | 5/1977 | Wilmot et al. | 59/85 |

FOREIGN PATENT DOCUMENTS

| 164581 | of 0000 | Australia | . |
|---|---|---|---|
| 853682 | of 0000 | Fed. Rep. of Germany | . |
| 1060162 | 3/1954 | France | 74/251 R |
| 1199428 | 12/1959 | France | 74/254 |
| 1474401 | 2/1967 | France | 198/851 |
| 292330 | 6/1932 | Italy | 74/254 |
| 1169141 | 3/1968 | United Kingdom | 403/261 |
| 1188550 | 4/1970 | United Kingdom | 85/8.8 |
| 138433 | of 0000 | U.S.S.R. | . |

Primary Examiner—Leslie Braun
Attorney, Agent, or Firm—Price, Heneveld, Huizenga & Cooper

[57] ABSTRACT

A protective pivot pin assembly for chains, and especially conveyor chains, and a chain assembly incorporating that pin assembly. The pin includes a collar telescoped over one end and retained by a retaining ring or other securing member. The collar has a recess which receives the retaining ring therein when the collar is urged against the ring by chain links assembled on the pin. When extended, the combined widths and thicknesses of the links hold the collar over the ring to protect the ring and prevent removal of the ring and premature disassembly of the chain. When entirely relaxed, the chain may be collapsed, allowing the collar to be slid back and the ring to be manually removed.

25 Claims, 9 Drawing Figures

CHAIN PIN ASSEMBLY WITH CAPTIVE SECURING MEANS

BACKGROUND OF THE INVENTION

This invention relates to chain assemblies and pivot pins therefore and, more particularly, to a pivot pin assembly for chains and especially conveyor chains.

Conveyor chains, and especially those used in overhead conveyors typically include a center link with side links pivotally connected to each end of the center link by pivot pins. The center link is secured to a trolley bracket supported by trolley wheels on a rail. A sprocket or drive gear imparts movement to the chain for conveying suspended items along the rail.

One common prior known type of pivot pin used in such chain includes an integral, enlarged head at each end which retains the side and center links together along the pin. Such pins are inserted through enlarged apertures in the links and slid into their final position. In order to prevent disassembly of such "rivetless" chains, locking, non-rotational pins are used, i.e., pins with pin heads which are typically elongated and parallel to one another. The end of each center link is wider than its center portion. The pins are inserted through the three links, and rotated such that the elongated heads are received in recesses on the exterior sides of the side links. Extension or tightening of the chain causes the wider end of the center link to force the side links apart preventing the elongated heads from rotating out of their side link recesses.

Rivetless chain is expensive to manufacture because of required forging or machining of the pins and links, and the required tools and dies therefore. Also the elongated heads of the above-described pins prevent rotation, causing continuous wear of only one portion of the pin and reduced life or more frequent repair of the chain.

Certain chains with rotatable, wear compensating pins have also been proposed. Such pins typically include a cotter pin or other removable fastener retaining a washer at one end of the pin to hold the links in position. However, because of the constant motion, vibration and stress imposed on the conveyor chain as well as other industrial operations which occur in the environment in which conveyor chains are used, it has been found that such removable fasteners are often lost, broken or knocked loose resulting in chain disassembly, high maintenance costs, and frequent down time for conveyor lines.

The present invention was conceived as a solution to the above problems of wear, chain disassembly and pivot pin manufacture.

SUMMARY OF THE INVENTION

Accordingly, the present invention provides a pivot pin assembly, as well as a chain assembly using such a pivot pin assembly, which includes a removable fastener to retain a collar in place on the pin body or shaft. The collar is structured to protect and secure the removable fastener to prevent removal of the fastener and disassembly of the pin parts and the pin from the chain unless the chain is sufficiently relaxed and the fastener is manually removed. The pin assembly does not require the use of elongated, nonrotational, locking-type pin heads, thereby allowing pin rotation in the links for even distribution of wear around the entire pin when the pin is cylindrical. The pin and chain assembly cannot disassemble even under conditions of high load, stress or vibration or even if the chain or pin assembly is accidentally struck by another object. Moreover, even when the chain is relaxed the fastener must be manually removed before the chain can be disassembled.

In one embodiment, invention is a pivot pin assembly for chains including a pin having a pin body and first and second retaining means at spaced positions along the pin body for retaining chain links therebetween when such links are assembled over the pin body. One of the retaining means includes a collar which telescopes over one end of the pin body via an aperture in the collar. A removable securing means is secured to and extends outwardly from the pin body between the collar and the one end of the body over which the collar is telescoped. The collar includes a recess in its surface adjacent to the removable securing means, the recess being slightly larger than the securing means. When the collar is abutted against the securing means by chain links on the pin, the securing means are freely received in the recess. When the pin is cylindrical, the recess allows rotation of the collar around the pin body and securing means. The recess protects and prevents removal of the securing means unless the collar is slid away from them.

The pin assembly is adapted for use with a chain assembly including at least one center link having a pin receiving aperture adjacent each end. A pair of side links is included, each side link having an aperture therethrough at each end. The side links are received one on each side of the center link with the corresponding ends of the side links overlapping one end of the center link such that the apertures are aligned. Spacing means between each end of the center link and each of the side links are included to space the side links outwardly of the center link. A pivot pin assembly as described above is used to allow pivotal movement of the side links with respect to the center link. When the chain is extended, the spacing means forces the side links apart such that the collar is pushed outwardly and abuts the securing means. This results in the recess of the collar surrounding and protecting the securing means to prevent disassembly of the chain while the spacing means space the links apart.

In a preferred embodiment, the securing means is a split, annular, retaining ring received in an annular groove formed in the circumference of the pin body. The collar includes an annular recess which slip-fits closely over the retaining ring.

Various types of side and center links can be used with the pin assembly while various configurations of collars in the pin assembly can be used to facilitate chain articulation and pivotal movement. The spacing means is preferably a widened end of the center link. The preferred environment for this invention is in conveyor chains, especially of the overhead type.

The present invention provides numerous advantages over prior chain and chain pin assemblies, especially those for use with conveyors. The preferred retaining ring of the present invention is considerably stronger and more reliable than other removable fasteners. The securing means, such as the retaining ring, are protected against premature removal and the chain against premature disassembly by the surrounding recess of the collar. The collar cannot be removed from its protective position unless the chain is sufficiently relaxed and the side links are not spaced apart by the spacing means. Use of the present pin assembly eliminates the need for elongated, non-rotational, locking-type pin heads. Pin rotation and rotation of the collar on the pin can occur when the pin is cylindrical allowing even wear distribution around the pin. Chain disassembly is also prevented even when more than the normal amount of slack occurs in the chain of a conveyor line. Moreover, the present pin assembly is less expensive to manufacture than other pins and pin assemblies, while assembly, repair or replacement of the pins in a chain assembly remains simple.

These and other objects, advantages, purposes and features of the invention will become more apparent from a study of the following description taken in conjunction with the drawings.

DESCRIPTION OF THE PREFERRED EMBODIMENT

Figure 1:
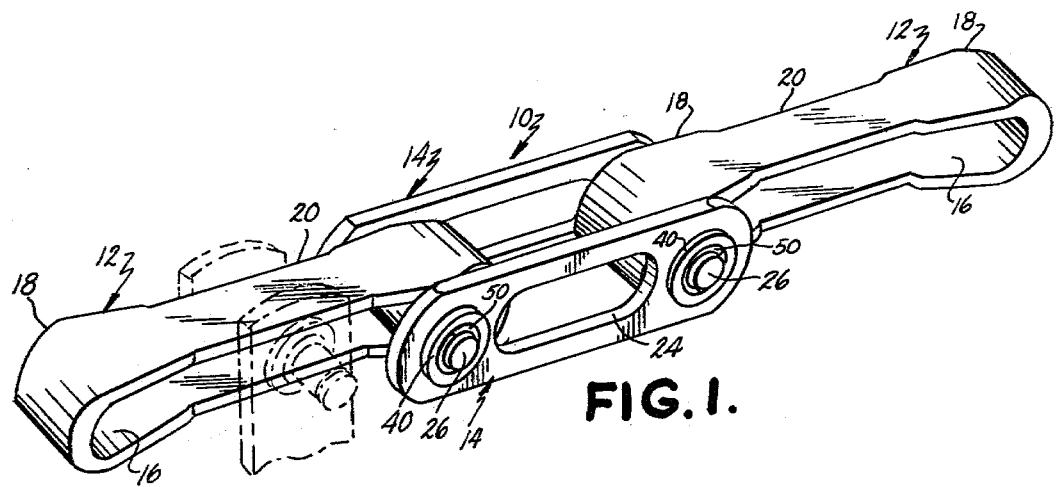
FIG. 1 is a perspective view of a portion of a conveyor chain including the pin assembly of the present invention.
Figure 2:
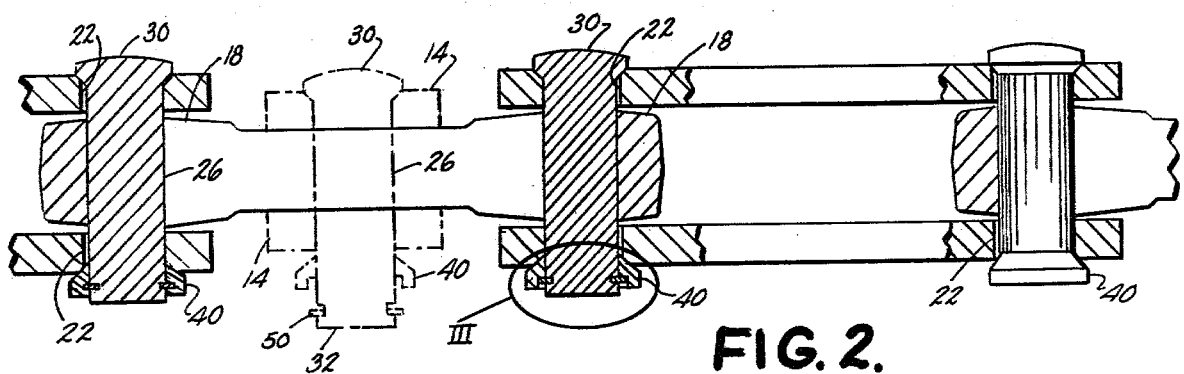
FIG. 2 is a fragmentary, sectional view of the chain assembly of FIG. 1.

Referring now to the drawings in greater detail, FIG. 1 illustrates one embodiment 10 of a chain assembly including the present invention. Chain 10 includes forged, metallic center links 12 pivotally joined to identical pairs of side links 14. Each center link 12 is a continuous band of metal forming an elongated, continuous central aperture 16 extending entirely through the link and having rounded ends matching the diameter of the pivot pins received therethrough. The ends 18 of the center link are wider than the reduced width center portion 20 as is best seen in FIGS. 1 and 2. In fact, the widest portion of the center link corresponds to the center line of one of the pivot pin assemblies when that pin assembly is abutted against the end of the aperture 16 in center link 12. The end portions of the center link 12 on either side of the widest portion taper back and narrow to allow sufficient room and space for pivotal movement of the center link in the plane of the center line of the pivot pin with respect to the side links. Side links 14 are stamped or forged from planar sheet metal and include circular apertures 22 centered and extending therethrough at each rounded end. An elongated central aperture 24 is spaced between apertures 22 in the center of the link. Apertures 22 have diameters slightly larger than the pivot pins to allow rotation of the pins.

As will be seen from FIGS. 2, 3, 5 and 6, the first embodiment 25 of the pin assembly of the present invention includes three parts, namely, a pin 26, a collar 40 and a split, retaining band or ring 50. Pin 26 includes a cylindrical pin body 28 having an enlarged, circular head 30 formed integrally at one end of the pin body. Adjacent the opposite end 32 of the pin body is an annular groove 34 milled or cut in the circumference of the cylindrical pin body and having generally flat sides. Groove 34 is somewhat wider than the retaining ring 50 which it is designed to receive as explained below. End 32 is generally planar while the opposite end on the enlarged head 30 may be rounded as desired. In addition, the inner or under surface 36 of enlarged head 30 is beveled, chamfered or rounded to correspond to recesses in the links.

Figure 3:
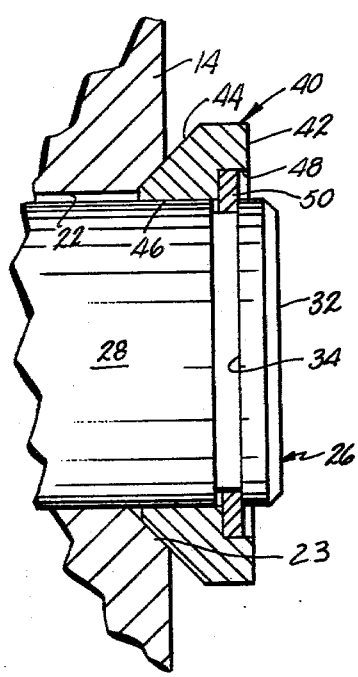
FIG. 3 is an enlarged, fragmentary, sectional view of one end of the pin assembly of the present invention including area III of FIG. 2.

Collar 40 (FIGS. 3 and 6) is generally cylindrical with a cylindrical outer circumference, a generally flat or planar side surface 42, and a beveled, chamfered or conical opposite side surface 44. Aperture 46 extends centrally through the collar and has a diameter slightly larger than the outside diameter of the cylindrical pin body 28. The collar may thus be easily slid and telescoped over the cylindrical surface of the pin body and can rotate on the pin. Formed in the flat or planar outer side surface 42 of collar 40 is an annular recess 48 as best seen in FIG. 3. Recess 48 has a diameter only slightly larger than the outside diameter of retaining ring 50 such that the recess 48 may be easily slipped over the circumference of the retaining ring when the same is received in groove 34 and yet closely surrounds the ring. The free, slip fit of recess 48 over snap ring 50 also allows collar 42 to rotate about the pin body and ring without resistance.

Figure 5:
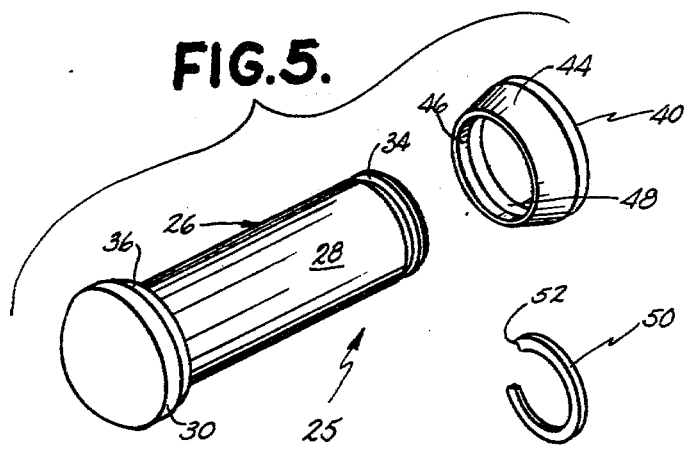
FIG. 5 is an exploded, perspective view of the pin assembly shown in FIGS. 1-3.

The final portion of the pin assembly 25 is the split, retaining ring or band 50 comprising a partial, annular band of spring steel or the like having a cutaway sector 52 (FIG. 5). The inside diameter of ring 50 approximates the diameter of the bottom of annular groove 34. Cutaway sector 52 of the snap ring is smaller than the diameter of the bottom of groove 34 such that the snap ring must be slightly expanded to allow placement of the ring in groove 34. When released, however, the spring-like resilience of the ring 50 will retain it in place in the groove. In addition, in the preferred embodiment, the side surfaces of ring 50 are planar and match the flat sides of groove 34 to prevent any camming action between the groove and ring which might otherwise aid its unintended removal from the groove when side thrust is imposed on the ring when chain assembly 10 is in use. However, rings or bands and grooves with other cross-sectional shapes and other than flat sides such as circular could also be used.

As will now be understood from FIGS. 1 through 3, assembly of the chain 10 is accomplished by aligning apertures 22 in side links 14 with the central portion of aperture 16 of center link 12. Preferably, side links 14 are positioned generally perpendicular to the extended direction of elongation of center link 12 as shown in phantom in FIG. 1. Pin 26 is thereafter inserted through aligned apertures 22, 16, 22 until head 30 abuts one of the exterior side link surfaces. Collar 40 is telescoped over the opposite end 32 of pin 26 such that it is intermediate the opposite side link and groove 34 as shown in phantom in FIGS. 1 and 2. Snap ring 50 is thereafter expanded and seated in groove 34. Links 14 and center link 12 may then be moved in opposite directions such that pin 26 and side links 14 are moved to the end of apertures 16 in link 12. This movement causes the wider ends 18 of link 12 to urge side links 14 outwardly toward the ends of pin 26. The side link simultaneously forces collar 40 outwardly toward pin end 32. When pin 26 reaches its position at the end of aperture 16, the widest portion at end 18 of link 12 serves as a spacer which urges links 14 completely outwardly and collar 50 is entirely received within recess 48 as shown in FIGS. 2 and 3.

As also shown in FIGS. 2 and 3, the edges of apertures 22 on the exterior surface of side links 14 may be beveled or chamfered as shown at 23 to receive the conical or beveled surface 44 of collar 40 or the beveled, chamfered or conical inner surface of head 30. The mating receipt of the conical collar and enlarged head in the beveled recesses in the side links reduces the required overall length of the pin and facilitates articulation of the side links with respect to the pin and center link 12.

As will be understood from FIGS. 1 and 2, the circular configuration of the pin body 26, head 30 and collar 40 together with the loose, rotational fit of collar 40 on pin body 26 and of recess 48 around snap ring 50 allows rotation of the pin within apertures 22 and 16 during use of the conveyor chain. Such rotational movement distributes the wear caused by the links evenly around the pin and lengthens the life of the pin. In addition, the present pin assembly is stronger and more durable than prior known pin assemblies such as those using cotter pins and washers because the sheering stress in the direction of the axis of the pin which is necessary to break or sheer off snap ring 50 is tremendously greater than it is for a single cotter pin.

Figure 7:
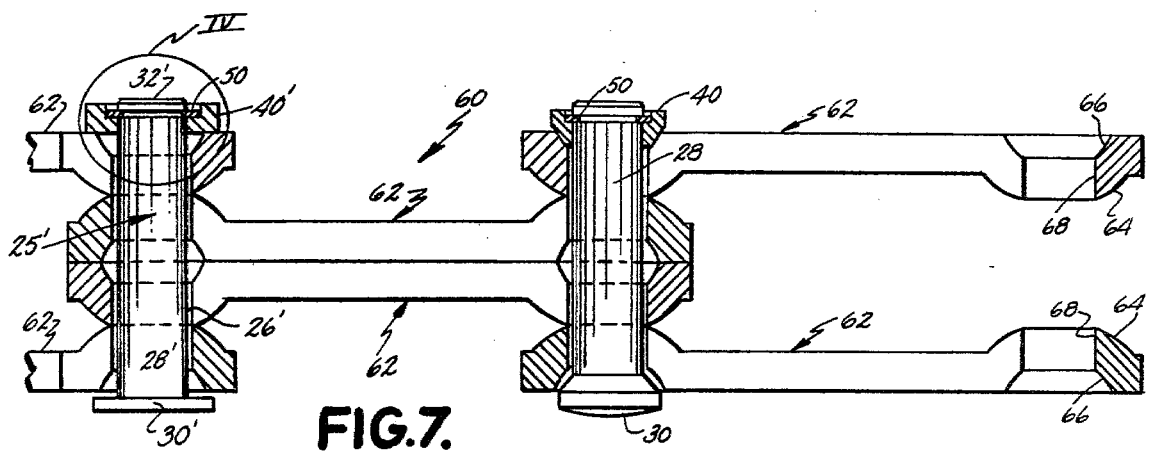
FIG. 7 is a fragmentary, sectional view of the pin assembly of the present invention in a second type of conveyor chain.

Referring now to FIG. 7, a second embodiment 60 of the chain assembly including the present invention is illustrated. Chain assembly 60 utilizes a plurality of identical, stamped chain links similar to those described and claimed in copending, commonly assigned U.S. patent application Ser. No. 897,400, filed on even date herewith, invented by Charles C. Frost, Edward D. Soberalski and Siegfried K. Weis, entitled CONVEYOR CHAIN WITH IDENTICAL LINK PARTS, the disclosure of which is hereby incorporated by reference herein. Each link part 62 in chain 60 is stamped from sheet metal and includes generally spherical or elongated, ridge-like, rounded protrusions 64 on one side at each end of each link and a corresponding, aligned recess 66 on the opposite side of each end of each link. The remaining areas of each link part 62 are generally planar. In the present embodiment, each link part 62 include a single, elongated aperture 68 having rounded ends matched to and a width slightly larger than the diameter of pin body 28 designed to be fitted therethrough.

As described in the above mentioned co-pending patent application and as shown in FIG. 7, a composite center link in chain 60 is formed from two of the identical link parts 62 placed back-to-back with their protrusions 64 extending outwardly, apertures 68 aligned and the links extending generally parallel to one another. Side links are formed by overlapping the ends of a spaced pair of identical link parts 62 with protrusions 64 extending inwardly and abutting and engaging projections 64 of the composite center link. A pin assembly 25 of the type described above is used to assemble the four identical link parts by passing the pin body 28 of pin 26 through the aligned apertures 68 of the link parts and assembling a collar 40 and snap ring 50 on the opposite free end of the pin in exactly the same manner as described above in connection with embodiment 10 in FIGS. 1-3, 5 and 6. During such assembly, the side link parts and pin 26 are moved to the reduced width center section of the composite center link, the pin inserted, and the side links and pin slid back toward one end of the aperture 68 in the composite center link. Such movement forces protrusions 64 against one another, thereby urging side link parts 62 outwardly and sliding collar 40 and recess 48 over snap ring 50 to protect and retain the same in place as described above. Protrusions 64 continue to space the links apart and maintain recess 48 over ring 50 during use of the chain. Chain 50 provides the manufacturing simplicity, cost advantages and articulation advantages fully described in connection with the above co-pending application Ser. No. 897,400. The beveled or rounded under surfaces of head 30 and collar 40 correspond well to the recesses 66 formed in link parts 62.

Figure 4:
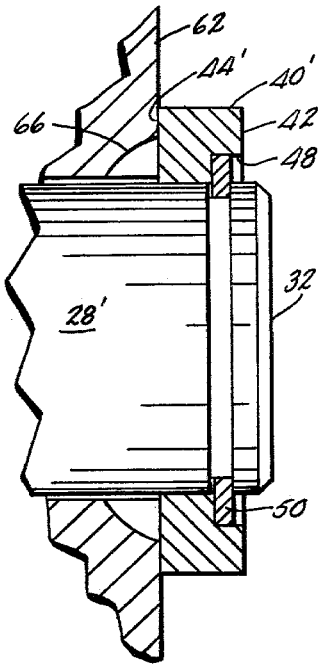
FIG. 4 is an enlarged, fragmentary, sectional view of a portion of a second embodiment of the pin assembly of the present invention taken in area IV of FIG. 7.
Figure 6:
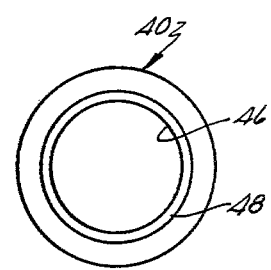
FIG. 6 is an end view of the collar used in the present pin assembly.

It is also shown in FIGS. 4 and 7, a slightly different embodiment 25' of the pivot pin assembly may be used with chain 60 or indeed chain 10 or any of the other chains described herein. Pin assembly 25' includes a pin body 28', a flat, enlarged head 30' and a flat collar or washer 40' telescoped over pin end 32' opposite flat head 30'. Collar 40' differs from collar 40 only in that both its side surfaces 42', 44' are generally flat, planar and parallel to one another. Recess 48' is similar to recess 48, is formed in surface 42' and functions exactly the same as recess 48 to protect and retain snap ring 50 in place on pin 28'. As will be seen in FIG. 7, however, the flat undersurface of enlarged head 30' and surface 44' of collar 40' engage corresponding flat, planar surfaces surrounding the end of aperture 68 on the exterior side surfaces of link parts 62 which form the side links in chain 60.

Figure 8:
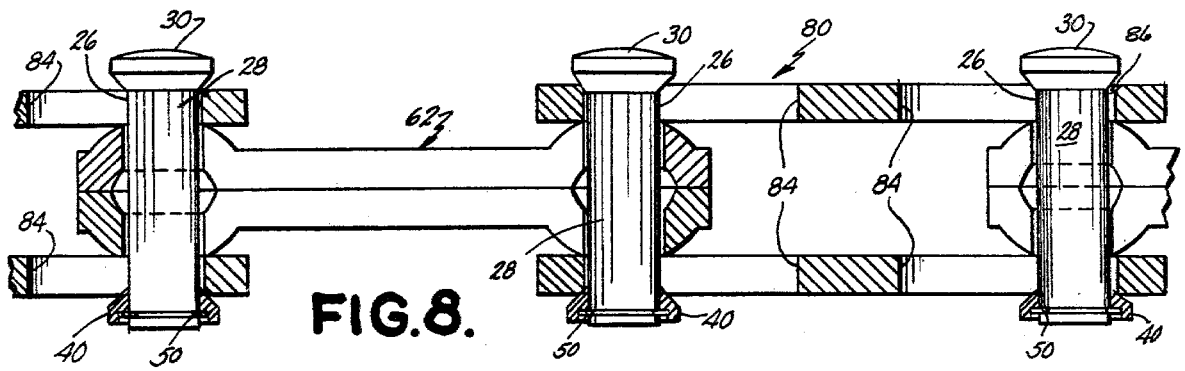
FIG. 8 is a fragmentary, sectional view of the pin assembly of the present invention in a third type of conveyor chain.
Figure 9:
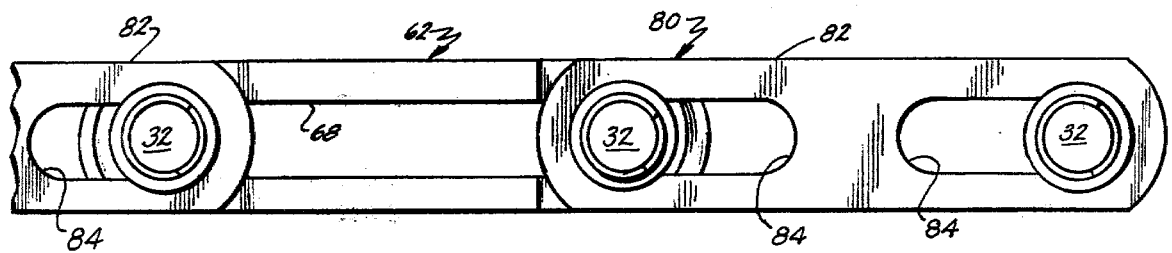
FIG. 9 is a fragmentary, side elevation of the chain assembly shown in FIG. 8.

As shown in FIGS. 8 and 9, yet another embodiment 80 of a chain assembly using the present invention is illustrated. Chain assembly 80 includes a composite center link formed from identical link parts 62 of the type described above in connection with chain assembly 60. Link parts 62 are placed back-to-back in exactly the same manner to form an exactly similar composite center link as included in chain 60. However, chain 80 includes side links 82 having generally flat or planar side surfaces without any protrusions therealong as in chain 60. Side links 82 also include a pair of elongated apertures 84 having rounded ends and widths slightly larger than the diameter of pins 26, 26' adapted to be received therethrough to retain the links together. Apertures 84 extend from adjacent the rounded ends of links 82 toward the center or middle of these links to allow take-up of slack in the chain when the chain is relaxed. In addition, the end portions of apertures 84 adjacent the ends of the links may be recessed as at 86 (FIG. 8) to receive the beveled, chamfered or rounded undersurfaces of enlarged heads 30 of pins 26 or surfaces 44 of collars 40 as shown in FIG. 8. Apertures 84 could be circular if desired since the elongated center aperture in center links 62 allows assembly of the links, pin, collar and retaining ring as explained above. Again, either of the pin assemblies 25 or 25' may be used with chain 80 and assembly of side links 82 with the composite center link formed from identical link parts 62, including spacing protrusions 64 is accomplished in exactly the same manner as with chain embodiments 10 and 60 described above.

In each of the described chain embodiments 10, 60, and 80, the length of pin 26 or 26' is chosen to be sufficient to receive collar 40 or 40' and snap ring 50 and to provide a slight space or additional length between the adjacent surfaces of the side and center links at the position of the apertures or ends of the apertures in the side links and at the widest portion of the center link, i.e., at its ends. In fact, it has been found that a proper choice of dimension for the length of the pin is such that only one-third of the thickness of the snap ring will protrude from the recess 48 or 48' when the chain is laterally compressed. That is, when the chain is fully extended, the links are generally parallel to one another, the pin is received through the widest portion of the center link and at the ends of the respective apertures in all the various links, and the links and collar 40 or 40' are all compressed together and pushed along the pin toward pin head 30, the properly designed chain and pin length provides sufficient spacing to allow only one-third of the thickness of the snap ring 50 to extend out of recess 48 or 48'. Thus, even if such maximum lateral chain compression occurred during use of the conveyor, the recess 48 or 48' would maintain its protection and prevention of disassembly of the pin and chain assembly. Normally, however, the snap ring 50 is entirely received in the recess 48 or 48' which has a depth greater than the thickness of the snap ring for this purpose. In an actual tested embodiment of chain 10, the preferred dimensions for clearance between the side and center links is between 0.010 and 0.015 inches, the preferred thickness of the snap ring 50 is 0.0625 inches, and the preferred depth of the recess 48 or 48' is 0.010 to 0.0125 inches. Also, the thickness of side links 14 is preferably 0.25 inches, the widest portion of end 18 of center link 12 is preferably between about 0.730 and 0.755 inches, and the length of pin 26 is preferably between about 1.605 and 1.620 inches.

Pin assemblies 25, 25' are preferably formed from the standard steel or ferrous alloy metals used to form conventional conveyor chains. However, this invention will also be advantageous when formed from stainless steel or plastics and used in sanitary conveyor applications where frequent washing is encountered and resistence to corrosion is necessary.

Accordingly, the present invention provides an easily assembled, high strength, pin and chain assembly in which disassembly of the various parts is prevented and the securing means for the pin assembly is protected against damage and abrasion during use. While the above pin embodiments have been described with an integral head on one end of the pin, it is also possible to use a collar 40 or 40' and retaining band or ring 50 at each end of a straight pin to retain chain links together. Disassembly of the chain could then be accomplished from either end of the pin.

Although the preferred pin assemblies herein have been described with cylindrical pin bodies allowing pin rotation, other pin body shapes could be used such as oval, square, rectangular, hexagonal or the like. The apertures through the collars would normally correspond to the pin body shape. However, slightly oversize circular apertures in the collars would function adequately with such pin bodies if maintenance of collar rotation was desired. Similarly, the apertures through the side of center links could be matched to these other pin body shapes if pin rotation was not necessary or desired. Otherwise, circular or elongated apertures could still be used in the links. In each case, however, the collar would freely slip-fit over the pin body and retainer.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims that follow.

The embodiments of the invention in which an exclusive property or privilege is claimed are defined as follows:

1. A chain assembly comprising at least one center link having a pivot pin receiving aperture therethrough adjacent each end, at least one pair of side links, said side links having apertures therethrough at each end and received one on each side of said center link with the corresponding ends of said side links overlapping one end of said center link such that said respective apertures are aligned; spacing means at each end of said center link and said side links for spacing said side links outwardly along a pivot pin; a pivot pin extending through said aligned apertures to allow pivotal movement of said side links with respect to said center link; said pivot pin including a pin body having a width, a length greater than the combined thickness of said side links, said center link and said spacing means, and first and second retaining means at spaced positions on said pin body for retaining said chain links therebetween; at least one of said retaining means including a collar having a width greater than said pin body and an aperture therethrough, one end of said pin body being slidably telescoped through said collar aperture; said one retaining means also including removable securing means secured to and extending outwardly from said pin body between said collar and said one end of said pin body and having an outside dimension; said collar including a recess in its surface adjacent said removable securing means, said recess being only slightly larger than said outside dimension of said securing means such that said collar is slidable over said removable securing means to receive said securing means therein when said chain is extended and said spacing means forces said side links apart and said collar is slid outwardly such that said collar abuts said securing means, said recess fitting closely over said removable securing means whereby said collar protects and prevents removal of said securing means and disassembly of said chain while said spacing means spaces said links apart and said collar is retained over said securing means with said removable securing means in said recess.

2. The chain of claim 1 wherein said pin body is cylindrical; the other of said retaining means including an enlarged head integral with the end of said pin body which is opposite said one end.

3. The chain of claim 1 or 2 wherein said removable securing means include a groove in the outer surface of said pin body adjacent said one end and a split, retaining band received in said groove.

4. The chain of claim 3 wherein said side links each include a conical recess about each of said apertures therein in their outer surfaces; said surface of said collar on the opposite side of said collar from said recess being conical; the inner surface of said enlarged head also being conical; said conical surfaces being received in said conical recesses of said side links.

5. The chain of claim 3 wherein said groove is annular; said retaining band being an annular, snap ring; said recess in said collar being annular and only large enough to allow said split, snap, retaining ring to slipfit therein.

6. The chain of claim 5 wherein said recess has a depth greater than the thickness of said split, snap, retaining ring such that said split, snap, retaining ring is entirely received in said recess.

7. The chain of claim 6 wherein said annular groove has a width greater than the thickness of said split, snap, retaining ring.

8. The chain of claim 1 wherein said recess has a depth greater than the thickness of said removable securing means such that said securing means are entirely received in said recess.

9. The chain of claims 2 or 3 wherein said collar is a flat washer with said recess in one side surface thereof.

10. The chain of claim 1 wherein said pivot pin receiving apertures at each end of said center link communicate with one another forming a continuous, elongated aperture through said center link which ends adjacent each end of said center link; said spacing means including outwardly extending portions on each end of said center link, the area of said center link between said outwardly extending portions providing a reduced width center section whereby said pin and side links can be moved in said continuous aperture to said reduced width center section of said center link and said side links and collar slid inwardly along said pin body toward said center link to allow removal of said securing means.

11. The chain of claim 1 wherein said center link includes a pair of identical link portions abutting, parallel and aligned with one another; said spacing means including an outwardly extending, rounded protrusion adjacent each end of each of said identical link portions through which at least a portion of said aperture extends, the combined thicknesses of said protrusions art each end of said abutting identical link portions providing wide, end portions of said center link with the area between said protrusions forming a reduced width center portion of said center link.

12. The chain of claim 11 wherein each of said side links include rounded, inwardly extending protrusions adjacent each end through which at least a portion of said respective apertures extend at each end, said inwardly extending and outwardly extending protrusions abutting one another between said side links and identical center link portions and facilitating pivotal movement of said chain.

13. The chain of claim 11 wherein the side surfaces of each of said side links are generally planar.

14. The chain of claim 13 wherein each aperture at each end of each side link is elongated toward the middle of its respective side link.

15. A chain assembly especially adapted for use with conveyors comprising at least one center link having a reduced center portion between its ends and a continuous, elongated aperture therethrough extending through said center portion and ending adjacent each end, at least one pair of side links, said side links having apertures therethrough at each end and received one on each side of said center link with the corresponding ends of said side links overlapping one end of said center link such that said respective apertures are aligned; a pivot pin extending through said aligned apertures to allow pivotal movement of said side links with respect to said center link; said pivot pin including a cylindrical pin body, an enlarged head at one end of said pin body and an annular groove adjacent the opposite end of said pin body; a collar having an aperture therethrough slidably telescoped over said opposite pin body end such that it is rotatable on said pin body and positioned intermediate said enlarged head and groove; and a split, annular, retaining ring mounted on said pin body in said groove; said collar including an annular recess only slightly larger than said retaining ring in its side surface adjacent said retaining ring; said collar abutting said retaining ring with said retaining ring slidably received in said recess and said recess fitting closely thereover and surrounding said retaining ring when said chain is extended and one of said center links ends forces said side links apart such that said collar is slid outwardly over said retaining ring whereby said recess surrounds and protects said retaining ring and prevents its removal unless said side links and pin are moved to said reduced width center portion of said center link and said collar is slid away from said retaining ring and said retaining ring is no longer within said collar recess.

16. A pivot pin assembly for chains comprising a pin having a pin body of predetermined width, and first and second retaining means at spaced positions on said pin body for retaining chain links therebetween when such links are assembled over said pin body; at least one of said retaining means including a collar having a width greater than said pin body and an aperture therethrough, one end of said pin body being slidably telescoped through said collar aperture; said one retaining means including removable securing means secured to and extending outwardly from said pin body between said collar and said one end of said pin body and having an inside dimension contacting said pin body and an outside dimension; said collar including a recess in its surface adjacent said removable securing means, said recess having an interior, circumferential wall facing said pin body being only slightly larger than said outside dimension of said securing means such that it freely receives said securing means therein but fits closely thereover to prevent removal of said securing means when said collar abuts said securing means when chain links are retained on said pin body between said collar and the other of said retaining means, the radial distance between the outer surface of said pin body and said interior, circumferential wall of said recess being less than the radial distance between said inside and outside dimensions of said removable securing means whereby said collar protects and prevents removal of said securing means unless it is slid away from said securing means toward said other retaining means and said securing means are no longer within said collar recess.

17. The pivot pin assembly of claim 16 wherein said pin body is cylindrical; the other of said retaining means including an enlarged head integral with the end of said pin body which is opposite said one end.

18. The pivot pin assembly of claims 16 or 17 wherein said removable securing means include a groove in the outer surface of said pin body adjacent said one end and a split, retaining band received in said groove.

19. The pivot pin assembly of claim 18 wherein the surface of said collar on the opposite side of said collar from said recess is conical.

20. The pivot pin assembly of claim 18 wherein said groove is annular; said retaining band being an annular, snap ring; said recess in said collar being annular and only large enough to allow said split, snap, retaining ring to slip-fit therein.

21. The pivot pin assembly of claim 20 wherein said recess has a depth greater than the thickness of said split, snap, retaining ring such that said retaining ring is entirely received in said recess.

22. The pivot pin assembly of claim 21 wherein said annular groove has a width greater than the thickness of said split, snap retaining ring.

23. The pivot pin assembly of claim 16 wherein said recess has a depth greater than the thickness of said removable securing means such that said securing means are entirely received in said recess.

24. A pivot pin assembly for chains comprising a pin having a cylindrical pin body, an enlarged head at one end of said pin body and an annular groove adjacent the opposite end of said pin body; a collar having an aperture therethrough slidably telescoped over the end of said pin body which is opposite said one pin body end such that it is rotatable on said pin body and intermediate said enlarged head and groove; and an expandable, split, retaining ring mounted on said pin body in said groove, said retaining ring having inside and outside diameters; said collar including an annular recess only slightly larger than said retaining ring in its side surface adjacent said retaining ring, said recess having an interior, annular wall facing said pin body; said collar abutting said retaining ring with said retaining ring slidably received in said recess, the radial distance between the outer surface of said pin body over which said retaining ring is expanded and mounted in said groove and said interior, annular wall of said recess being less than the radial distance between said inside and outside diameters of said retaining ring such that said recess fits closely thereover, surrounds and protects said retaining ring and prevents its expansion and removal unless said collar is slid away from said retaining ring toward said enlarged head and said retaining ring is no longer within said collar recess, said collar remaining rotatable around said pin body and said retaining ring.

25. The pivot pin assembly of claim 24 wherein said recess has a depth greater than the thickness of said split, retaining ring such that said split, retaining ring is entirely received in said recess.

* * * * *

UNITED STATES PATENT AND TRADEMARK OFFICE
CERTIFICATE OF CORRECTION

PATENT NO. : 4,202,219
DATED : May 13, 1980
INVENTOR(S) : Siegfried K. Weis

It is certified that error appears in the above-identified patent and that said Letters Patent are hereby corrected as shown below:

Column 1, line 7:
"therefore" should be --therefor--

Column 1, line 34:
"therefore" should be --therefor--

Column 6, line 15:
"50" should be --60-- (second recitation)

Column 6, line 22:
"It" should be --As--

Column 7, lines 45 & 46:
"resistence" should be --resistance--

Column 9, line 39:
"art" should be --at--

UNITED STATES PATENT AND TRADEMARK OFFICE
CERTIFICATE OF CORRECTION

PATENT NO. : 4,202,219
DATED : May 13, 1980
INVENTOR(S) : Siegfried K. Weis

It is certified that error appears in the above-identified patent and that said Letters Patent are hereby corrected as shown below:

Column 9, line 59:
insert --width-- after "reduced"

Column 10, line 15:
"links" should be --link--

Signed and Sealed this

Ninth Day of September 1980

[SEAL]

Attest:

SIDNEY A. DIAMOND

Attesting Officer

Commissioner of Patents and Trademarks